(12) United States Patent
Mack

(10) Patent No.: US 7,832,965 B2
(45) Date of Patent: Nov. 16, 2010

(54) DRILL

(75) Inventor: Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 962 days.

(21) Appl. No.: 11/640,812

(22) Filed: Dec. 18, 2006

(65) Prior Publication Data

US 2007/0145693 A1   Jun. 28, 2007

(30) Foreign Application Priority Data

Dec. 23, 2005   (DE) .................. 10 2005 062 402

(51) Int. Cl.
*B23B 31/02*   (2006.01)

(52) U.S. Cl. ............... 408/56; 408/67; 408/240; 279/60; 279/43.9; 279/157

(58) Field of Classification Search ............ 408/56, 408/67, 238, 239 R, 240; 279/60–63, 43.9, 279/46.9, 157

See application file for complete search history.

(56) References Cited

U.S. PATENT DOCUMENTS

| 2,155,082 | A | * | 4/1939 | Decker ................ 173/217 |
| 2,452,268 | A | * | 10/1948 | Schumann ............. 173/75 |
| 3,244,428 | A | * | 4/1966 | Rohm .................. 279/60 |
| 3,599,999 | A | * | 8/1971 | Schnizler et al. ......... 279/60 |
| 5,580,197 | A | * | 12/1996 | Rohm ................. 408/240 |
| 5,590,985 | A | * | 1/1997 | Mack .................. 408/56 |
| 6,572,310 | B2 | * | 6/2003 | Temple-Wilson ......... 408/56 |
| 6,595,527 | B2 | * | 7/2003 | Mack ................. 279/62 |
| 2004/0227309 | A1 | * | 11/2004 | Rohm ................ 279/62 |

FOREIGN PATENT DOCUMENTS

| EP | 0 716 896 | 6/1996 |
| WO | 2006/119728 | 11/2006 |

* cited by examiner

*Primary Examiner*—Daniel W Howell
(74) *Attorney, Agent, or Firm*—Andrew Wilford

(57) ABSTRACT

A drill has a housing formed with an outlet hole, a fan expelling an air stream from the outlet hole, a drive spindle projecting from the housing adjacent the outlet and centered on and rotatable about an axis, and a chuck body carried on the housing. A tightening sleeve rotatable about the axis on the chuck body carries a plurality of radially shiftable jaws, and interengaging screw formations operatively engaged between the body and the sleeve can shift the jaws radially in the guides on rotation of the sleeve relative to the body. A shield sleeve angularly fixed to the housing and surrounding the tightening sleeve has a rear end juxtaposed with the housing radially outside the outlet hole such that the air stream enters the shield sleeve. Inside the shield sleeve forward of its rear end a passage and a particle-expelling hole collect drilling particles and blow them out the particle-expelling hole.

14 Claims, 5 Drawing Sheets

DRILL

FIELD OF THE INVENTION

The present invention relates to a drill. More particularly this invention concerns a power drill.

BACKGROUND OF THE INVENTION

A standard power drill has a spindle that is typically rotated by an electric motor about its axis and that is threaded so that it can be fitted to a body of a drill chuck. locked at the drill spindle and clamping jaws that can be adjusted with relation to the chuck body by means of a rotatable tightening sleeve; moreover having a coupling arranged between the spindle thread and the tightening sleeve, positively locking the tightening sleeve with the spindle thread in circumferential direction when actuated.

EP 0 716 896 describes a drill having a coupling associated with a position detector that controls a switching device, switching on and off the actuation of the drill spindle in such a way that the spindle drive is switched off when the coupling is moved from the uncoupled state into the coupled state of the coupling such that the user cannot be endangered by an operating mistake when the coupling is actuated during the operation of the drill spindle. Furthermore, it is to be understood that direct access to the tightening sleeve for the actuation of the drill chuck is no longer required when the drill bit is properly chucked.

OBJECTS OF THE INVENTION

It is therefore an object of the present invention to provide an improved drill.

Another object is the provision of such an improved drill that overcomes the above-given disadvantages, in particular that is designed such that thanks to the presence of the coupling a further increased security level is achieved.

SUMMARY OF THE INVENTION

A drill has a housing formed with an outlet hole, a fan expelling an air stream from the outlet hole, a drive spindle projecting from the housing adjacent the outlet and centered on and rotatable about an axis, and a chuck body carried on the housing. A tightening sleeve rotatable about the axis on the chuck body carries a plurality of radially shiftable jaws, and interengaging screw formations operatively engaged between the body and the sleeve can shift the jaws radially in the guides on rotation of the sleeve relative to the body. A shield sleeve angularly fixed to the housing and surrounding the tightening sleeve has a rear end juxtaposed with the housing radially outside the outlet hole such that the air stream enters the shield sleeve. Inside the shield sleeve forward of its rear end a passage and a particle-expelling hole collect drilling particles and blow them out the particle-expelling hole.

In this drill, the turning parts of the drill driven by the spindle drive are shielded by means of the shield sleeve so that the only turning part that projects from the drill is the drilling tool or drill bit. The entire drill chuck is encapsulated and therefore neither the user can be hurt nor the tool to be processed can be damaged if, for example, there is direct contact between the workpiece and the drill.

However, it is to be noted that due to the closed construction of the drill chuck, drilling residue and particles cannot be transported to the outside in the common way, that is by the action of centrifugal force. Hence in order to thus avoid accumulation within the drill chuck the invention uses a continuously produced air stream in the drill in order to avoid entry of the drilling particles by feeding the cooling stream from the spindle housing into the area covered by the shield sleeve, providing a flow that works counter to the usual transport direction of the drilling particles.

In order to use the air stream as effectively as possible, the invention provides the outlet hole within the radial extension of the shield sleeve. This way the cooling air stream can flow directly into the shield sleeve and the cooling air leaving the holes at the side of the spindle housing does not have to be radially fed into the shield sleeve from the outside, a process that is only of small effect.

It is especially preferred when the air stream fed into the shield sleeve is led axially to the front to the clamping jaws between the shield sleeve and the tightening sleeve. Thanks to this embodiment, the effects caused when drilling particles, evacuated from the drill chuck in the usual way, meets obstacles are moderated in a particularly efficient manner, since the air stream transports the drilling particles out of the gap between the tightening sleeve and the shield sleeve.

A particularly effective expulsion of the drilling particles from the area between the tightening sleeve and the shield sleeve is achieved by providing radial holes in the tightening sleeve so as to eject these particles.

Alternatively, it is also possible to place the outlet hole within the radial extension of the tightening sleeve and to direct the air stream within the tightening sleeve axially to the front in the direction of the tightening sleeves. In that embodiment, increased penetration of drilling particles into the drill chuck covered by the tightening sleeve is avoided to prevent accumulation of drilling particles within the drill chuck. An accumulation of drilling particles between the shield sleeve and the tightening sleeve is thus indirectly and avoided.

In order to achieve as direct as possible guidance of the air stream within the drill chuck, at least one air-guiding passage is formed in the components composing the drill chuck, serving particularly for bridging the axial extension of the drill chuck in order to thus connect the axially rear hollow chambers and the axially front hollow chambers of the drill chuck.

Particularly with the air-guiding passage in a self-tightening drill chuck with the tightening sleeve formed by a clamping cone and a jaw holder radially guiding the clamping jaws engaging in a central thread of the chuck body with a holder thread, the air-guiding passage is formed in the holder. The air stream moves along the central axis of the drill chuck to the front end where the drill bit is clamped and thus to where drilling particles are generated. For that purpose it is advantageous if the air-guiding passage passes through the holder over its entire axial length.

Complementarily, it is also possible to provide the air-guiding passage in the holder with at least one radial branch in order to not only avoid entry of the drilling particles but also to lead to the expulsion of the drilling particles from the drill chuck.

Losses in the radial stream are avoided by providing a seal at the axial front end between the shield sleeve and the tightening sleeve.

Particularly if such an air-guiding passage is provided in a self-tightening drill chuck with the tightening sleeve formed by a clamping cone and a jaw holder, it is advantageous for the air-guiding passage to pass through the jaw chuck to the clamping jaws.

It has also been shown to be advantageous to provide a radial outlet hole in the shield sleeve allowing the drilling particles to be directly discharged from the area between the tightening sleeve and the shield sleeve.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
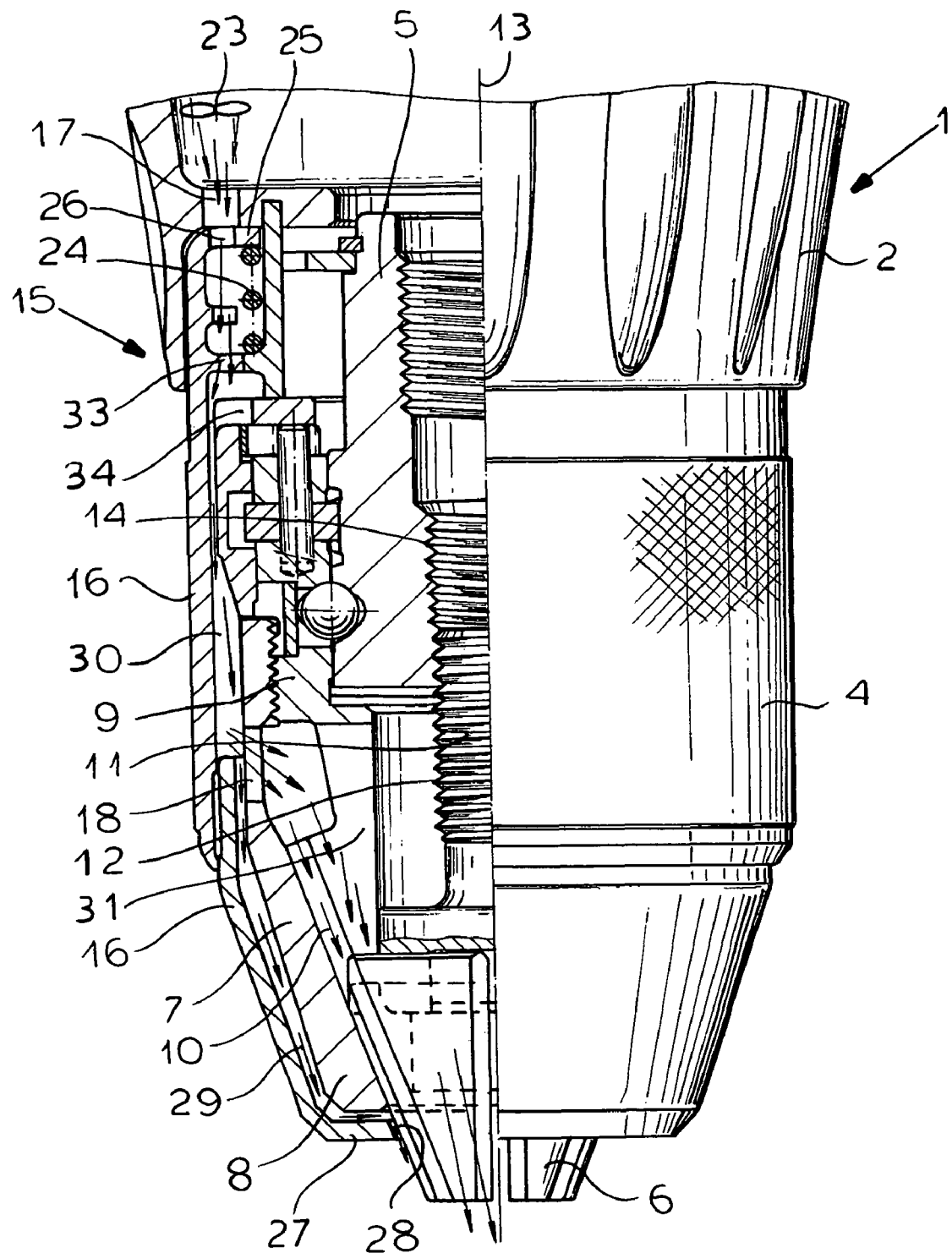
FIG. 1 is a side view partly in axial section through the chuck region of a drill according to the invention.

As seen in FIG. 1 a partially illustrated drill 1 according to the invention has a front end or spindle housing 2 in which a drill spindle 3 is rotatable about an axis 13 by an unillustrated electric motor. Furthermore, the drill 1 has a drill chuck 4 having a chuck body 5 threaded onto and rotatable about the axis 13 with the spindle 3 as well as clamping jaws 6 that can be shifted radially on the chuck body 5 by a tightening sleeve 7 that can be turned compared to the chuck body 5. Offset from the axis 13 the spindle housing 2 is formed with an axially forwardly open outlet hole or port 17 and internally the drill 1 is provided with a schematically illustrated fan 23 that forces a stream of air out through the hole 17 when the drill 1 is operating.

In the illustrated embodiment shown in the drawing, the drill chuck 4 is self-tightening. The tightening sleeve 7 is formed with a clamping cone 8 and a jaw holder 9. The cone 8 has on its inner face guide grooves 10 each holding a respective one of the clamping jaws 6. The clamping jaws 6 are furthermore radially guided in slots of a holder 11 engaging with a screwthread 12 in an inner thread 14 of the chuck body 5 that is coaxial with the chuck axis 13. As a result, the drill chuck 4 is opened and closed by rotating the tightening sleeve 7, jaws 6, and holder 11 relative to the chuck body 5. This causes the jaws 6 to shift along their guides 10 both radially and axially due to the axial shifting of the holder 11 as a result of the interaction of the threads 12 and 14.

According to the invention the tightening sleeve 7 is surrounded along its full length by a shield sleeve 16 that is rotationally locked to the housing 2 so that it does not rotate. The sleeve 16 has a bent in rear-end lip or rim 25 formed with holes 26 alignable with the holes 17 and with a front-end bent in lip or rim 27 forming a hole 28 through which the jaws 6 can project. In many applications, the jaws 6 are wholly retracted into the sleeve 16 and only a bit held by them projects axially forward past this nonrotating part.

A spring 24 braced against the rear end lip 24 urges it radially backward. A coupling 15 (see EP 0 716 896 or DE 10 2005 021 629) between the sleeve 16 locked to the housing 2 and the tightening sleeve 7 is operable to angularly couple the tightening sleeve 7 with the spindle housing 2 so that in case of a motor-driven drill spindle 3, the tightening sleeve 7 is locked against rotation and the drill chuck 4 can thus be opened or closed according to the rotation direction of the spindle 3. The coupling 15 is formed as axially extending and radially inwardly projecting ridges 33 or splines on the sleeve 16 and complementary outwardly open grooves 34 on the chuck body 5 that can fit with the splines 33 when the sleeve 16 is pushed forward against the force of a spring 24. Unillustrated interfitting ridges and grooves can lock the sleeve 16 and housing 2 together in the illustrated rear position.

According to the invention the drill chuck 4 can be actuated without the tightening sleeve 7 having to be touched by the user. Thus according to the invention, it is possible to enclose the tightening sleeve 7 within an outer shield sleeve 16 covering the tightening sleeve 7 radially on the outside and extending the full axial length of the chuck 4, so that the shield sleeve 16 is rotationally locked in a simple manner by coupling the shield sleeve 16 to the spindle housing 2. To this end the coupling sleeve 16 has a rear part with an internally directed rim or lip 25 against which the spring 24 bears and that is formed with an array of throughgoing holes 26 alignable with the hole(s) 17 and a front part formed with an inwardly projecting rim or lip 27 engaging around the front end of the sleeve 17 and forming a hole 28 through which only the jaws 6 can poke.

Thus the sleeve 16, which in FIG. 1 is wholly laterally closed, completely surrounds and contains the parts of the chuck. In order to avoid accumulation of particles generated by the drilling operation in the space or passage 30 enclosed by the shield sleeve 16, a cooling air stream generated by the fan 23 of the drill 1 passes out of the spindle housing 2 through the outlet hole 17 in the spindle housing 2, through the hole(s) 26, and enters the passage 30 of the shield sleeve 16. To this end the outlet hole 17 is aligned axially with one or more of the holes 26, and there may even be more than one hole 17. Furthermore, FIG. 1 shows that the air stream (shown by arrows) in the passage 30 between the shield sleeve 16 and the tightening sleeve 7 is led axially to the front in the direction of the clamping jaws 6, so that the drilling particles penetrating into that area are blown out the hole 28 again thanks to this air stream.

FIG. 1 shows furthermore that the tightening sleeve 7, that is the clamping cone 8, is formed with an array radially throughgoing particle-expelling holes 18. These radial particle-expelling holes 18, on the one hand, ensure that the drilling particles are expelled under the action of centrifugal force radially to the outside into the area 30 between the shield sleeve 16 and the tightening sleeve 7, whence the drilling particles can be transported back to the front along the passage branch 29 formed between the inner surface of the front end of the sleeve 16 and the outer surface of the sleeve 7 and away out through the hole 28 with the stream of air. On the other hand, the air stream flows into the tightening sleeve 7 through these radial holes 18 and thus blows particles forwardly from a space or passage branch 31 therein to clean it.

Figure 2:
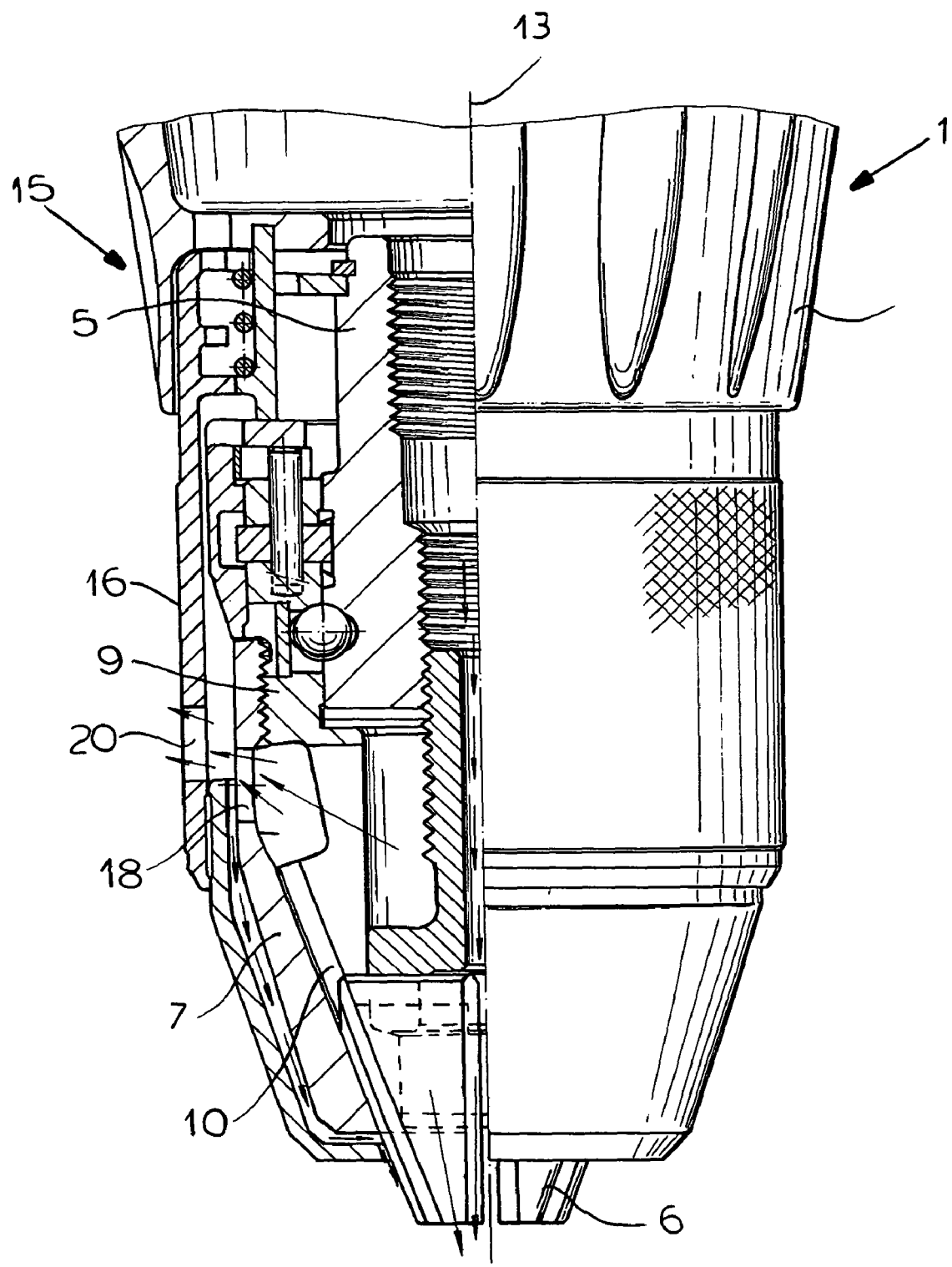
FIGS. 2, 3, 4, and 5 are views like FIG. 1 showing variants on the chuck in accordance with the invention.
Figure 3:
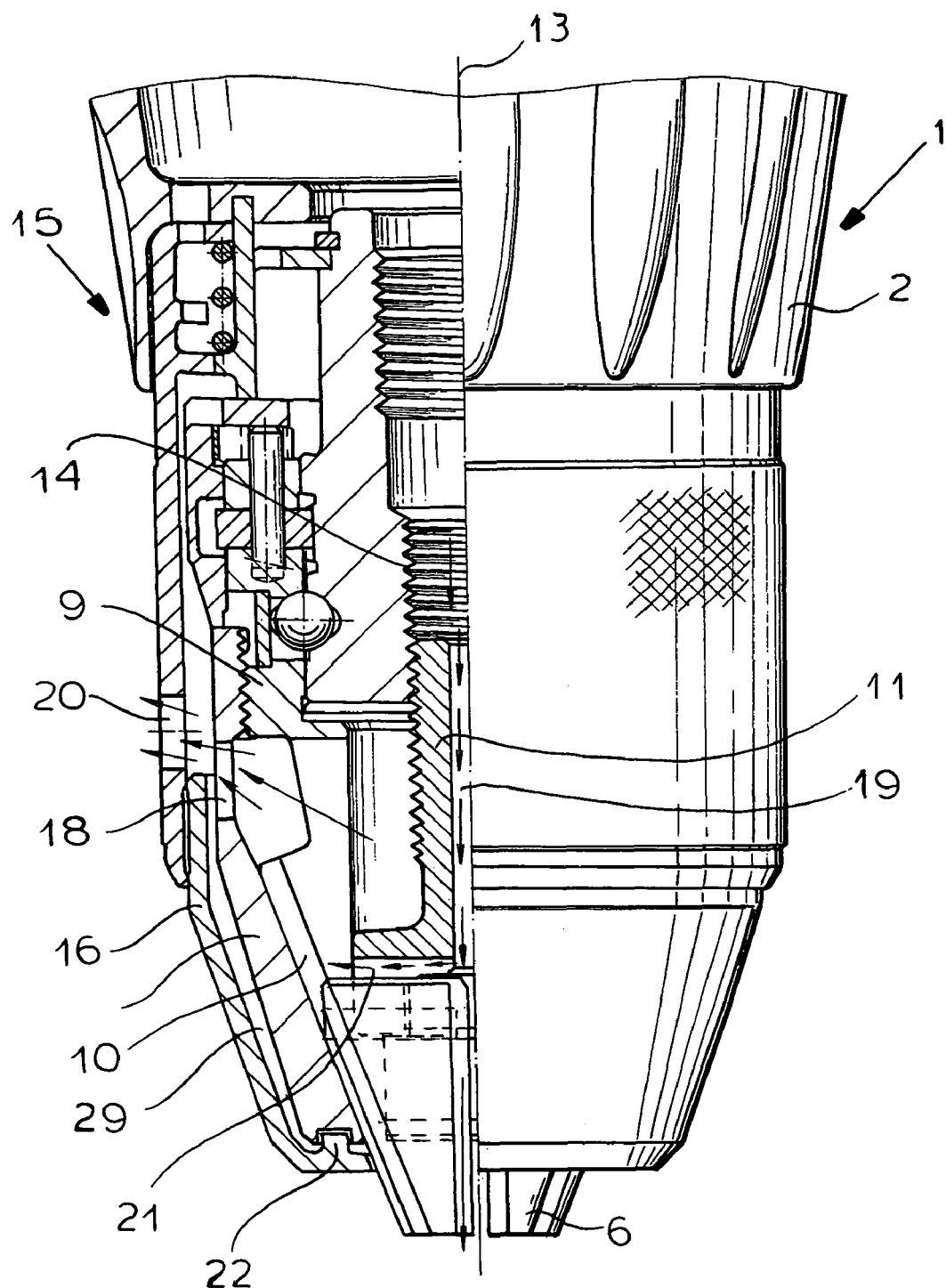
Figure 5:
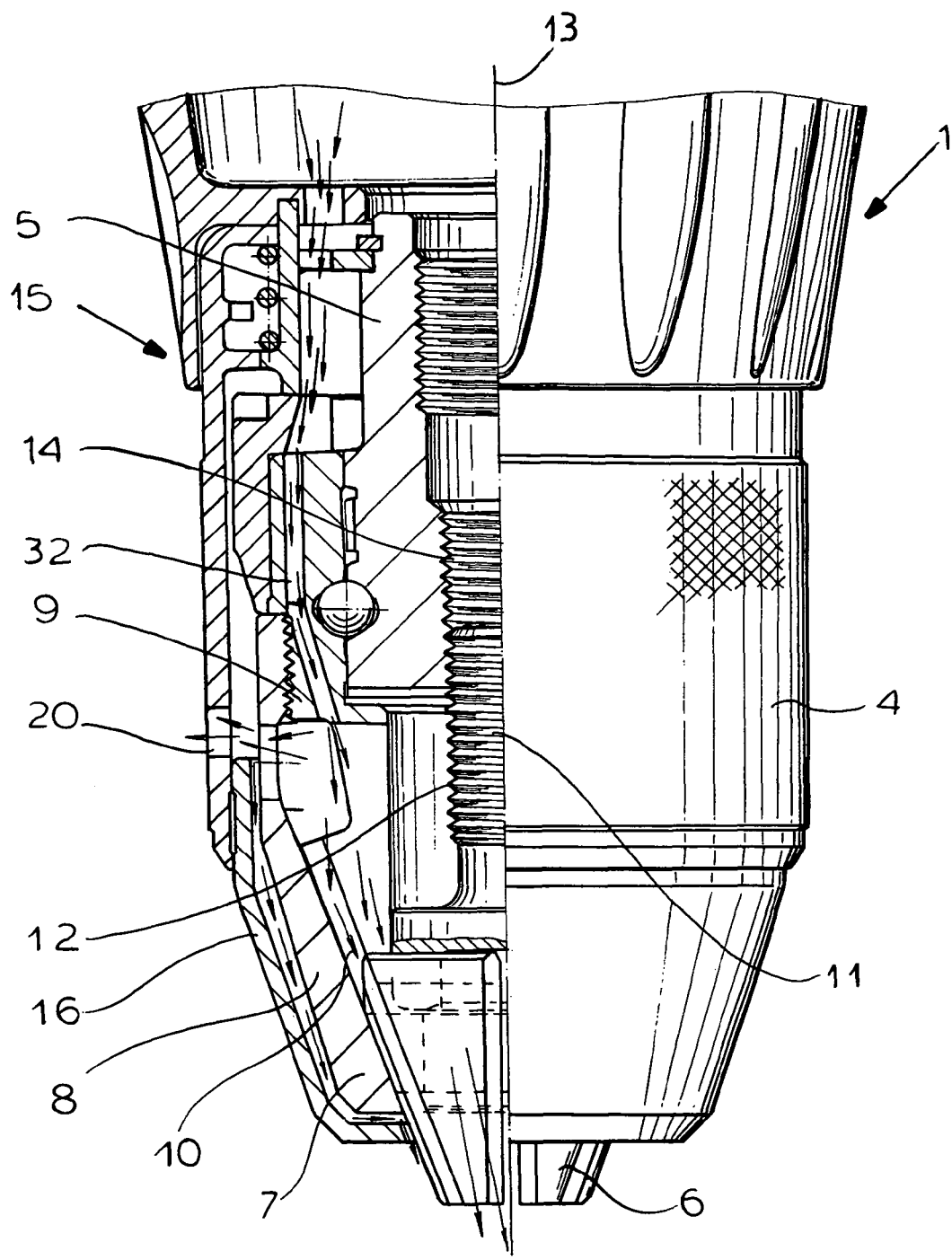

FIGS. 2, 3 and 5 show embodiments in which, as a further development of the embodiment shown in FIG. 1, a radial hole 20 is provided in the shield sleeve 16 that allows direct discharge of the air stream from a central region of the shield sleeve 16 to blow out drilling particles. Furthermore, FIG. 2 shows an embodiment where a axially forwardly open air-guiding passage 19 is formed axially centrally in the holder 11 and is fed by the outlet hole 17 that is already provided in the spindle housing 2 and through which passes the drill spindle 3. The drill spindle 3 itself can be also provided with a central passage for the air stream so that the fan 23 not only blows air out the hole 17, but also through the coaxial central hole through the spindle 3 and the aligned passage 19 of the holder 11. That embodiment mainly uses the maximal pressure achieved by the air stream to counteract entry of the drilling particles to the central axis 13 of the drill chuck 4, to which end the air-guiding passage 19 passes through the full axial length of the holder 11.

Alternatively, or in addition, it is possible as shown in FIG. 3, to provide the air-guiding passage 19 with at least one radial branch 21 in the holder 11 in order to blow drilling particles radially out through the radial outlet hole 20 and the holes 18, parallel to the action of centrifugal force.

FIG. 3 also shows that a labyrinth seal 22 is provided at the axial front end between the shield sleeve 16 and the tightening sleeve 7, that is an annular ridge engaging axially in an annular groove that provided on the shield sleeve 16 and on the tightening sleeve 7. Such sealing prevents an axial stream to the front and thus avoids reduction of the air stream directed radially outward of the shield sleeve 16. At the same time, drilling particles can accumulate because of the sealing structure in the region 29 between the shield sleeve 16 and the tightening sleeve 7, but the suction effect of the air stream, particularly when augmented by gravity in case of overhead drilling, assures an effective cleaning of this region as well.

Figure 4:
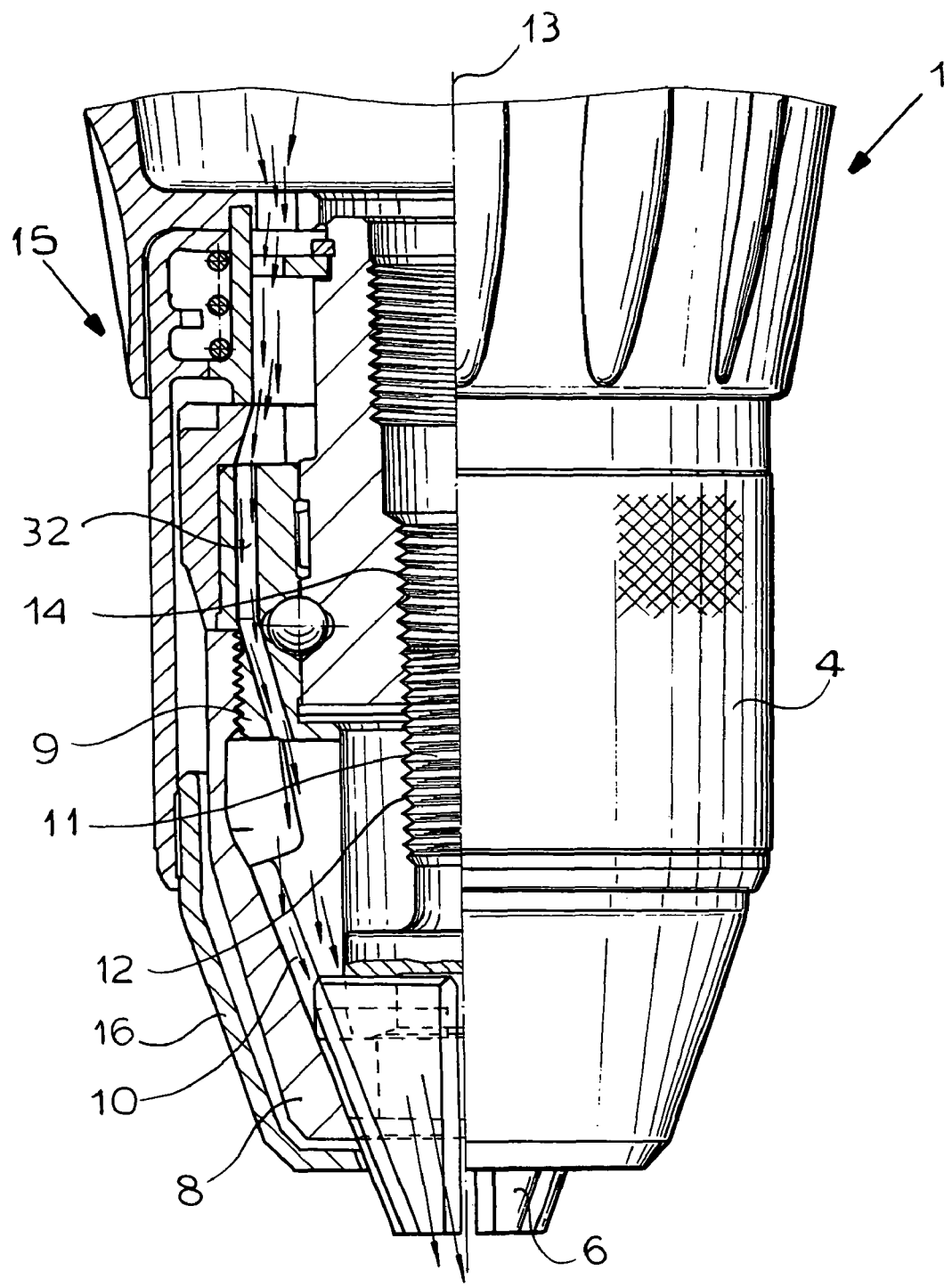

FIG. 4 shows an embodiment in which the outlet hole 17 is placed within the radial extension of the tightening sleeve 7 and the air stream is led axially to the front in the direction of the clamping jaws 6, so that in this embodiment, an accumulation of particles in the area between the shield sleeve 16 and the tightening sleeve 7 is basically avoided as a preventive measure. In order to thereby effectively lead the air stream from the spindle housing 2 axially to the front to the drill chuck, an air-guiding passage 32 is formed in the components carrying the drill chuck 4, that is in the jaw holder 9.

FIG. 5 shows an embodiment like that of FIG. 4 but where, as in the embodiment of FIG. 4, a radial outlet hole 20 is formed in the shield sleeve 16 that allows the air stream to be directly discharged from the shield sleeve 16, carrying along drilling particles.

I claim:

1. A drill comprising:
    a housing formed with an outlet hole;
    means for expelling an air stream from the outlet hole;
    a drive spindle projecting from the housing adjacent the outlet hole and centered on and rotatable about an axis;
    a chuck body carried on the housing;
    a tightening sleeve rotatable about the axis on the chuck body;
    a plurality of radially shiftable jaws inside the sleeve;
    interengaging screw formations operatively engaged between the body and the sleeve, whereby relative rotation about the axis of the body and the sleeve shifts the jaws radially in the guides;
    a shield sleeve rotationally fixed to the housing, surrounding the tightening sleeve, and having a rear end juxtaposed with the housing radially outside the outlet hole such that the air stream enters the shield sleeve; and
    structure forming inside the shield sleeve forward of its rear end a passage and a particle-expelling hole relatively oriented so as to collect drilling particles and blow them out the particle-expelling hole.

2. The drill defined in claim 1, further comprising
    coupling formations on the shield sleeve and on the tightening sleeve interengageable for rotationally arresting the tightening and shield sleeves.

3. The drill defined in claim 2 wherein the coupling formations include a spring urging the shield sleeve axially rearward on the tightening sleeve into a decoupling position with the formations disengaged from each other.

4. The drill defined in claim 1 wherein the passage is formed between an inner surface of the shield sleeve and an outer surface of the tightening sleeve.

5. The drill defined in claim 4 wherein the particle-expelling hole is formed at a front end of the shield sleeve and is axially forwardly open, the jaws being engageable through the particle-expelling hole.

6. The drill defined in claim 5 wherein the shield sleeve is substantially radially closed between its front end and its rear end, whereby the air current exits the shield sleeve primarily at the front end.

7. The drill defined in claim 4 wherein the shield sleeve is centrally formed with a radially open hole, whereby the air current exits the shield sleeve through the radial hole.

8. The drill defined in claim 7 wherein the tightening sleeve is formed with a radially throughgoing hole, whereby particles driven centrifugally through the tightening-sleeve radial hole are entrained by the air stream and expelled through the shield-sleeve radial hole.

9. The drill defined in claim 7, further comprising
    a seal at the front end of the shield sleeve preventing air from escaping from the passage at the front end.

10. The drill defined in claim 9 wherein the seal is a labyrinth seal.

11. The drill defined in claim 1, further comprising
    a holder carrying the jaws and having one of the screw formations, the holder being formed with an axially throughgoing passage, the chuck body diverting the air stream into the holder passage.

12. The drill defined in claim 11 wherein the holder is formed immediately axially rearward of the jaws with radially open branch passages opening centrally into the holder passage, whereby particles behind the jaws are expelled radially outward from behind the jaws by the air stream.

13. The drill defined in claim in claim wherein 12 the shield sleeve is centrally formed with a radially open hole, whereby the air current exits the shield sleeve through the radial hole, the tightening sleeve being formed with a radially throughgoing hole, whereby particles driven centrifugally through the tightening-sleeve radial hole are entrained by the air stream and expelled through the shield-sleeve radial hole.

14. The drill defined in claim 1 wherein the passage is formed in the chuck body and tightening sleeve and opens between the jaws axially at a front end of the chuck body.

* * * * *